US012764605B2

(12) United States Patent
Ryu

(10) Patent No.: US 12,764,605 B2
(45) Date of Patent: Oct. 13, 2026

(54) SELECTIVE CENTRALIZED UNIT-USER PLANE EXTENDED BUFFERING

(71) Applicant: Boost SubscriberCo L.L.C., Englewood, CO (US)

(72) Inventor: Jinsook Ryu, Oakton, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 746 days.

(21) Appl. No.: 18/092,128

(22) Filed: Dec. 30, 2022

(65) Prior Publication Data

US 2024/0224120 A1 Jul. 4, 2024

(51) Int. Cl.
*H04W 76/12* (2018.01)
*H04W 28/14* (2009.01)

(52) U.S. Cl.
CPC ........... *H04W 28/14* (2013.01); *H04W 76/12* (2018.02)

(58) Field of Classification Search
CPC ..... H04W 76/12; H04W 28/14; H04W 76/28; H04W 76/19; H04W 76/27; H04W 68/02
See application file for complete search history.

(56) References Cited

U.S. PATENT DOCUMENTS

2016/0286575 A1* 9/2016 Weingertner ......... G10L 19/167
2023/0146227 A1* 5/2023 Lee ........................ H04W 72/25 370/329
2024/0064852 A1* 2/2024 Wang .................... H04W 72/23

OTHER PUBLICATIONS

"A P4-based 5G User Plane Function", SOSR '21, Submission Id: 33, Sep. 20-21, 2021, 7 pages.
"Idle Mode Buffering and Paging", Frame Format for the PDU Session User Plane Protocol, Dec. 9, 2022, 4 pages.

* cited by examiner

*Primary Examiner* — Anez C Ebrahim
(74) *Attorney, Agent, or Firm* — Kipman T. Werking; Frontier IP Law PLLC

(57) ABSTRACT

A disclosed method may include (i) receiving a message including first buffering-relevant information relating to an ability of a specific centralized unit-user plane node to perform a buffering procedure, (ii) evaluating the first buffering-relevant information against second buffering-relevant information indicating at least in part whether an item of user equipment is an appropriate candidate for the buffering procedure, and (iii) assigning the specific centralized unit-user plane node based at least in part on evaluating the first buffering-relevant information against the second buffering-relevant information. Related systems and computer-readable mediums are further disclosed.

20 Claims, 8 Drawing Sheets

SELECTIVE CENTRALIZED UNIT-USER PLANE EXTENDED BUFFERING

BRIEF SUMMARY

This application is generally directed to selectively determining whether to buffer, at a centralized unit-user plane node, data directed to a connected item of user equipment in the context of a telecommunications network, as discussed in more detail below. In one example, a method may include (i) receiving, by a centralized unit-control plane node within a telecommunications network, a message facilitating assignment of a specific centralized unit-user plane node to the item of user equipment, the message including first buffering-relevant information relating to an ability of the specific centralized unit-user plane node to perform a buffering procedure, (ii) evaluating the first buffering-relevant information against second buffering-relevant information indicated by the item of user equipment attempting to connect to the telecommunications network through the specific centralized unit-user plane node, the second buffering-relevant information indicating at least in part whether the item of user equipment is an appropriate candidate for the buffering procedure, and (iii) assigning, by the centralized unit-control plane node, the specific centralized unit-user plane node to the item of user equipment based at least in part on evaluating the first buffering-relevant information relating to the ability of the specific centralized unit-user plane node to perform the buffering procedure against the second buffering-relevant information indicating at least in part whether the item of user equipment is an appropriate candidate for the buffering procedure.

In one example, the message is formatted according to a version of the E1 Application Protocol.

In one example, the message includes a setup message for establishing a new connection between the specific centralized unit-user plane node and the centralized unit-control plane node.

In one example, the first buffering-relevant information indicates a static capability of the specific centralized unit-user plane node to perform the buffering procedure.

In one example, the message includes a configuration update message for updating a configuration of a connection between the specific centralized unit-user plane node and the centralized unit-control plane node.

In one example, the first buffering-relevant information indicates a dynamic capability of the specific centralized unit-user plane node to perform the buffering procedure.

In one example, the message includes a radio access network repository function response message received from a radio access network repository function.

In one example, the message is received in response to the centralized unit-control plane node transmitting a centralized unit-user plane discovery message requesting information regarding at least one candidate centralized unit-user plane node for assigning to the item of user equipment.

In one example, the centralized unit-user plane discovery message indicates at least one of a detected activity state of the item of user equipment or a predicted mobility pattern of the item of user equipment.

In one example, the centralized unit-user plane discovery message indicates a location of the item of user equipment.

This application also further discloses a non-transitory computer-readable medium encoded with instructions that, when executed by a physical processor of a computing device, cause the computing device to perform the method of one or more embodiments of the method outlined above.

This application also further discloses a system configured to perform one or more of the embodiments outlined above.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
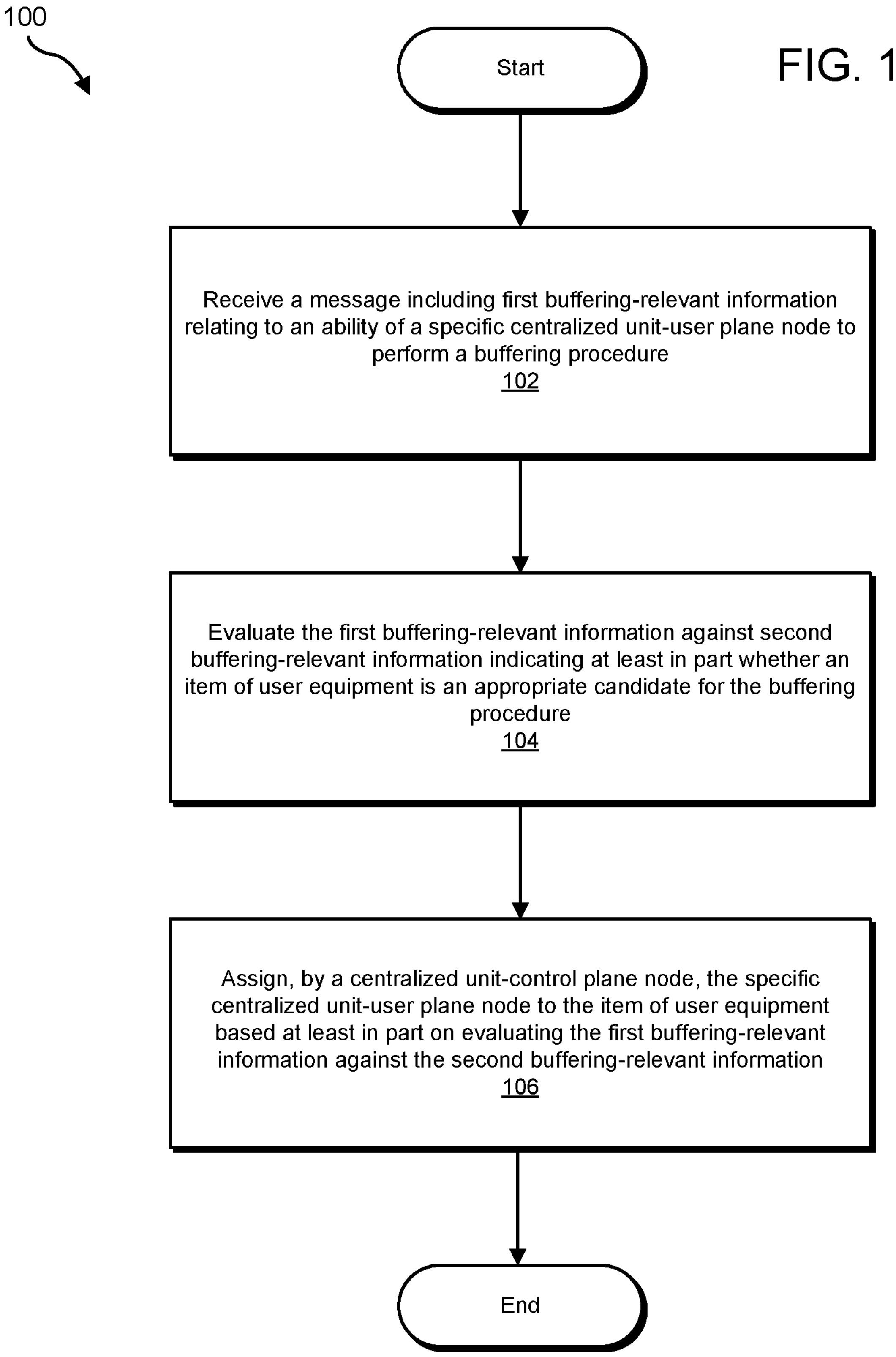
FIG. 1 shows a flow diagram for an example method relating to selective centralized unit-user plane extended buffering.

FIG. 1 shows a flow diagram for an example method 100 relating to selected centralized unit-user plane extended buffering. At step 102, one or more of the systems described herein may receive a message including first buffering-relevant information relating to an ability of a specific centralized unit-user plane node to perform a buffering procedure. In a particular environment, at step 102 the centralized unit-control plane node is disposed within a telecommunications network and may receive the message facilitating assignment of a specific centralized unit-user plane node to an item of user equipment.

At step 104, one or more of the systems described herein may evaluate the first buffering-relevant information against second buffering-relevant information indicating at least in part whether an item of user equipment is an appropriate candidate for the buffering procedure. In a particular embodiment, at step 104 the centralized unit-control plane node may evaluate the first buffering-relevant information against second buffering-relevant information indicated by the item of user equipment attempting to connect to the telecommunications network through the specific centralized unit-user plane node. As discussed further below, the phrase "user equipment attempting to connect to the telecommunications network through the specific centralized unit-user plane node" generally refers to the user equipment simply attempting to connect to the network and requesting to be assigned a particular centralized unit-user plane node, rather than the user equipment originally requesting connection to that specific centralized unit-user plane node in the first place.

At step 106, one or more of the systems described here may assign the specific centralized unit-user plane node to the item of user equipment based at least in part on evaluating the first buffering-relevant information against the second buffering-relevant information. In a particular embodiment, at step 106, the centralized unit-control plane node may assign the specific centralized unit-user plane node to the item of user equipment based at least in part on evaluating the first buffering-relevant information relating to the ability of the specific centralized unit-user plane node to perform the buffering procedure against the second buffering-relevant information indicating at least in part whether the item of user equipment is an appropriate candidate for the buffering procedure.

The following discussion, in the context of FIGS. 2-7, will provide an overview of additional embodiments, implementation details, and/or background contextual information regarding various aspects of method 100.

Figure 2:
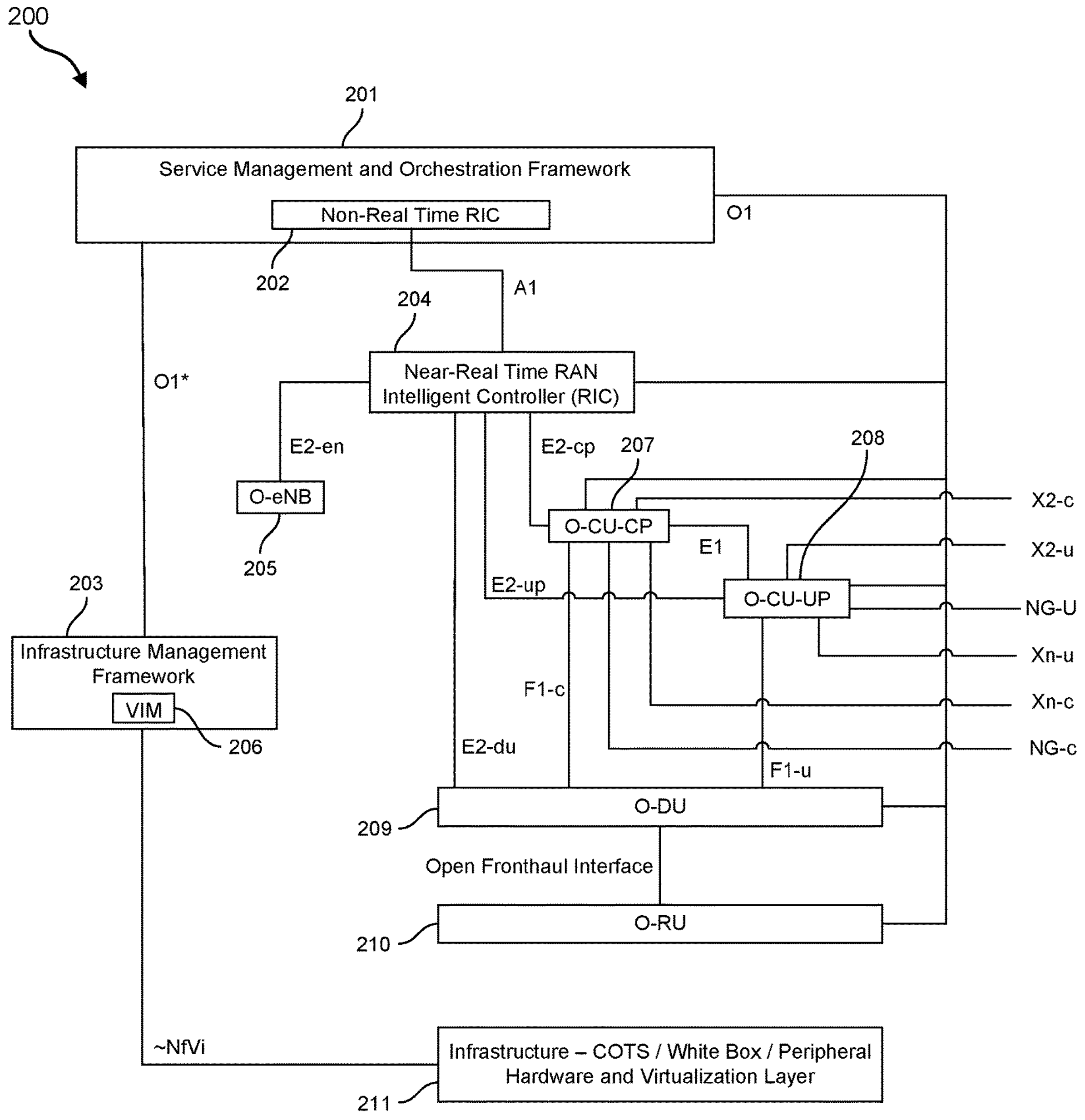
FIG. 2 shows an example open radio area network architecture.

FIG. 2 shows an illustrative architecture 200 corresponding to the open radio access network (O-RAN) architecture. In this example, the open radio access network software community (O-RAN SC) architecture follows the O-RAN alliance defined architecture.

Architecture 200 may include a service management and orchestration framework 201, which may interface with three primary components, an infrastructure management framework 203, an infrastructure 211, and a near-real-time radio access network intelligent controller (RIC) 204. Service management and orchestration framework 201 may further include a non-real time radio access network intelligent controller (RIC) 202. Infrastructure management framework 203 may further include a virtualized infrastructure manager (VIM) 206. And near-real-time radio access network intelligent controller 204 may further communicate with an evolved NodeB (O-eNB) 205, which corresponds to the hardware aspect of a 4G radio access network. Near-real time radio access network intelligent controller 204 also further interfaces with a centralized unit-control plane node 207 and a centralized unit-user plane node 208, as well as a distributed unit 209, and a radio unit 210, as further shown in this figure. In various embodiments, the technology of this application may focus upon communications and interactions between centralized unit-control plane node 207 and centralized unit-user plane node 208. FIG. 2 also further illustrates how architecture 200 may further include a multitude of communication lines interconnecting various ones of the components outlined above.

In the context of FIG. 2, radio access network (e.g., gNB or base station) disaggregation corresponds to an initial phase of the deployment of 5G technology, and a major application will be Enhanced Mobile Broadband (eMMB). Radio access network disaggregation can be performed according to the 3rd Generation Partnership Project (3GPP) or according to the O-RAN specification illustrated in the illustrative example of FIG. 2.

In some examples, a centralized unit-user plane deployment can be disposed more within a central or middle located data center. Alternatively, the centralized unit-user plane deployment can be co-located as part of functioning of the core network (e.g., Access and Mobility Management Function or AMF, Session Management Function or SMF, and/or the User Plane Function or UPF) within the centralized unit-control plane. In these examples, in most cases a single centralized unit-control plane services a single centralized unit-user plane.

Nevertheless, in further examples, to support different types of services or network slices, the user plane function may require or request different capabilities, such as computational power or different buffering capacity. Additionally, or alternatively, the user plane function may require or request different characteristics, including eMBB, ultra-reliable low latency communications (URLLC), and/or Industrial Internet of Things (IIoT).

For slice isolation support, a separated centralized unit-user plane can require or request for a specific network slice. Due to latency, some centralized unit-user planes can be closer to the edge of the network as part of Mobile Edge Computing (MEC). The centralized unit-user plane may be co-located with a distributed unit to be closer to the attachment point of the user, in which case the centralized unit-user plane will be more localized. Additionally, for user plane scalability, a single centralized unit-control plane may serve many centralized unit-control planes based upon their capabilities, as discussed further below.

Figure 3:
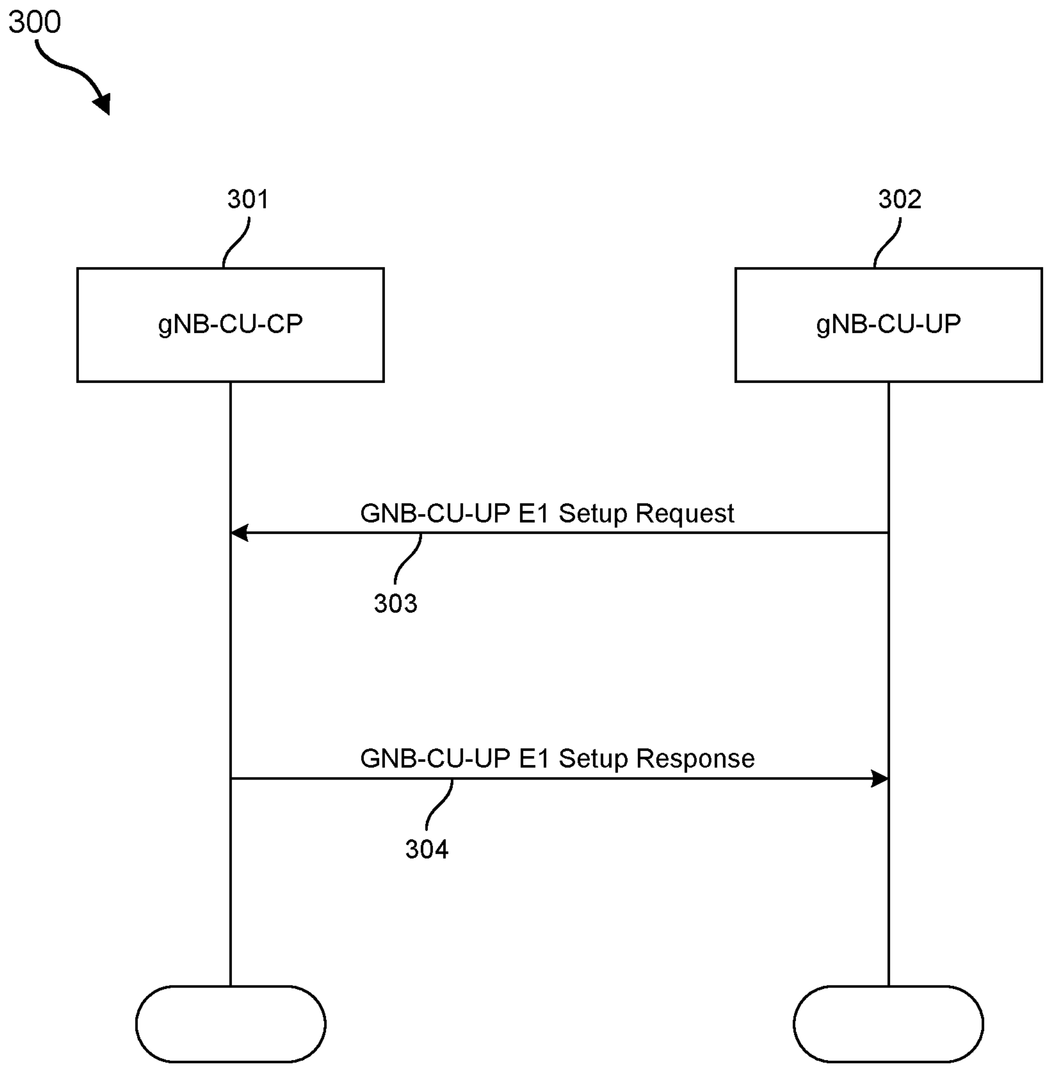
FIG. 3 shows an example workflow of communications between a centralized unit-control plane node and a centralized unit-user plane node.

FIG. 3 shows an example workflow 300 corresponding to communications between a centralized unit-user plane node 302 and a centralized unit-control plane node 301 in various embodiments. At workflow step 303, centralized unit-user plane node 302 may transmit a setup request to establish a connection or session between centralized unit-user plane node 302 and centralized unit-control plane node 301. The setup request may be formatted according to the E1 Application Protocol (E1AP) defined by the TS 37.483 9.2.1.4 specification, for example. In response, centralized unit-control plane node 301 may transmit a response, at workflow step 304, which may include an E1 setup response.

In these examples, the centralized unit-control plane may store centralized unit-user plane information. In various examples, one or more items of the stored centralized unit-user plane information may include a slice support list, a Cell Global Identifier (CGI) support list, a quality of service (QOS) parameter support list, and/or capacity information (i.e., for load-balancing). Additionally, or alternatively, in some examples the centralized unit-user plane can provide location information of the centralized unit-user plane (whether central or local) and/or the latency associated with the centralized unit-user plane, for example.

In various examples, the centralized unit-control plane may use one or more of the above listed items of information to select (i.e., during session setup) a particular serving centralized unit-user plane for a particular user equipment for bearer (e.g., the Protocol Data Unit or PDU session and/or a quality of service flow) setup.

Nevertheless, the configurations of the various embodiments listed above in the context of FIG. 3 may be associated with one or more deficiencies. In particular, a one-to-one setup and discovery procedure may not be scalable. On the contrary, multiple centralized unit-control planes may request a setup for the same centralized unit-user plane. Accordingly, for better scalability and for an improved cloud computing environment, a distinct or improved centralized unit-user plane discovery procedure may be helpful, as discussed in more detail below in the context of FIGS. 3-7.

Figure 4:
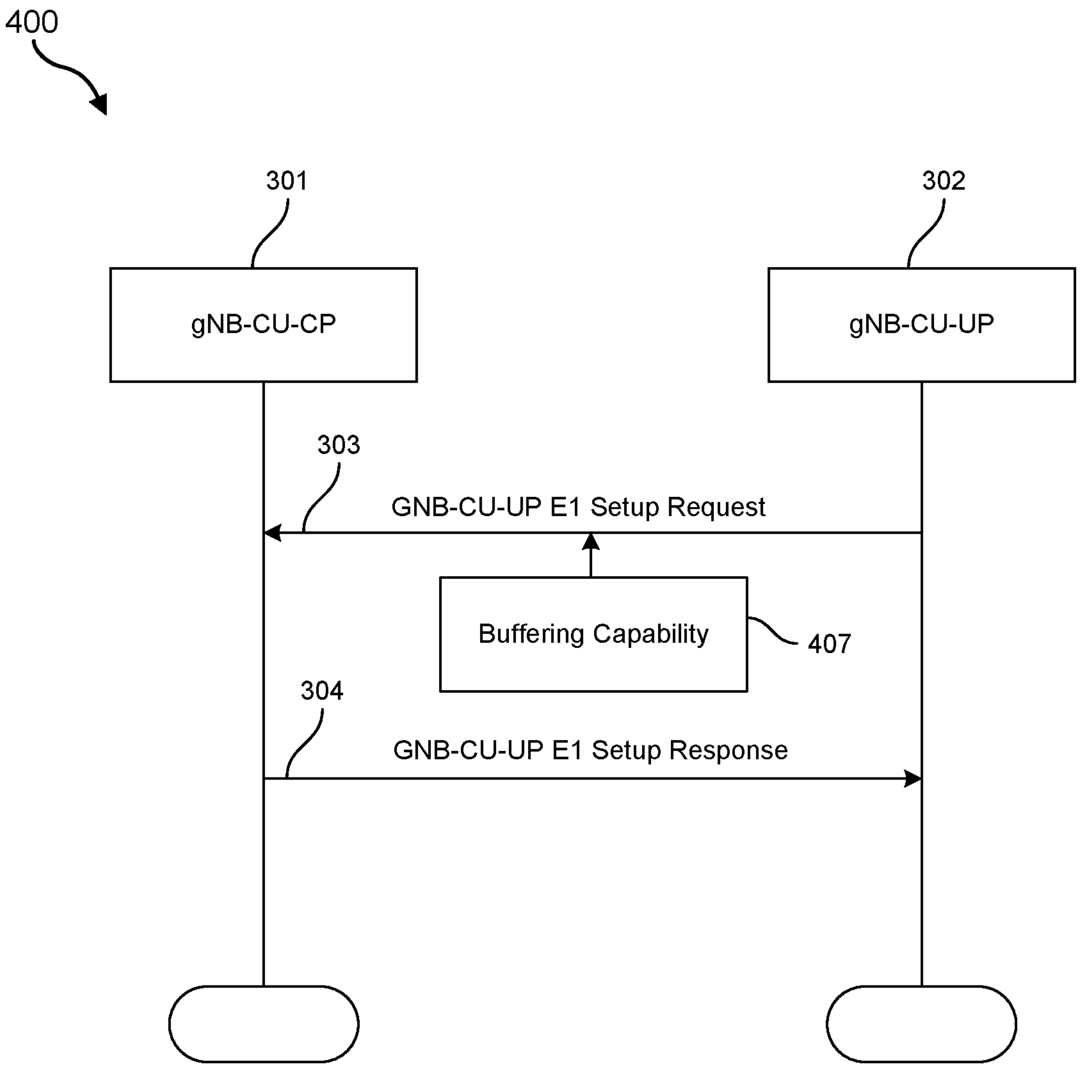
FIG. 4 shows an example workflow of communications between the centralized unit-control plane node and the centralized unit-user plane node as part of a setup request and response procedure.
Figure 5:
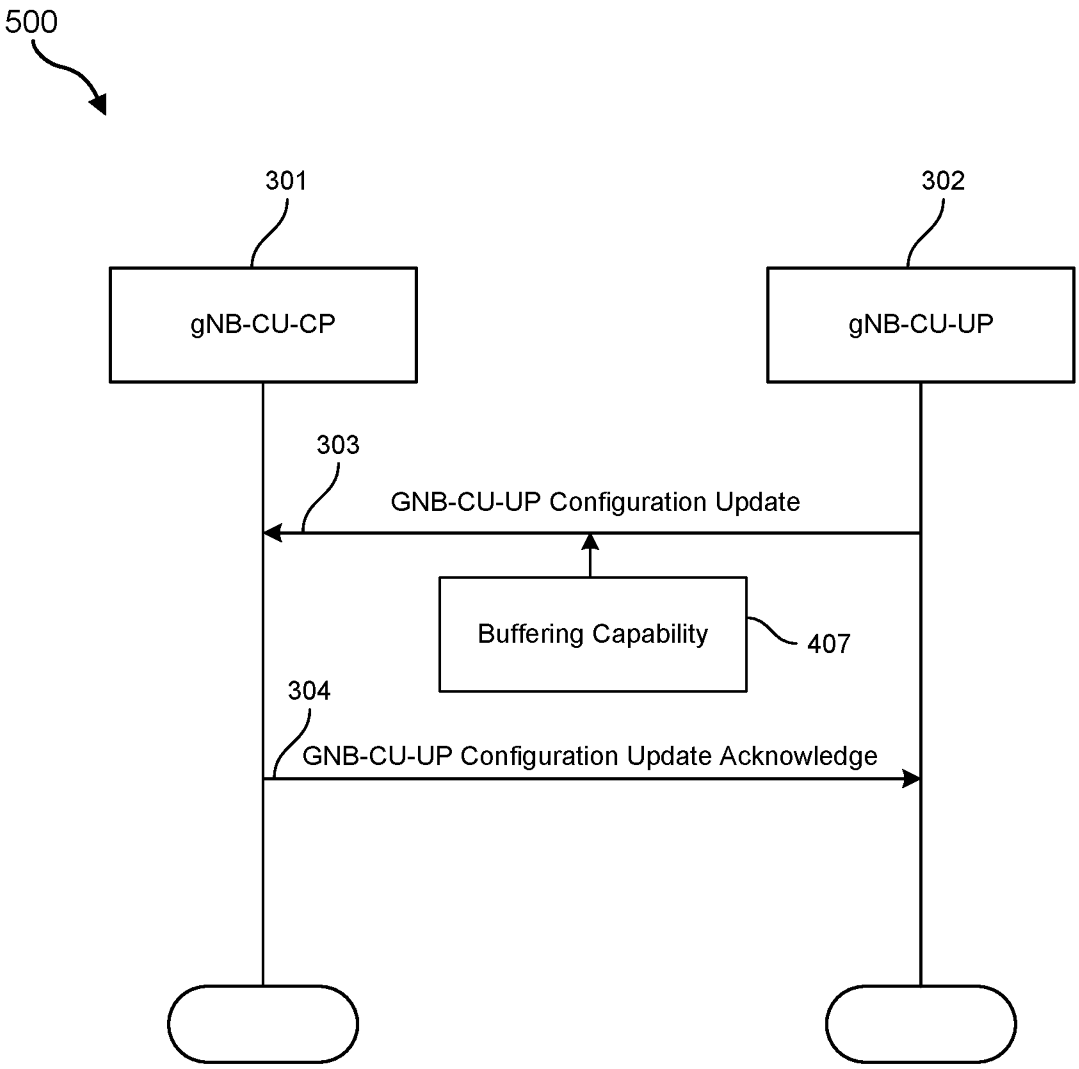
FIG. 5 shows an example workflow of communications between the centralized unit-control plane node and the centralized unit-user plane node as part of a configuration update and acknowledgment procedure.

From a high-level perspective, this application discloses at least two additional or alternative embodiments, or solutions, for assigning the specific centralized unit-user plane node to the item of user equipment. FIGS. 4-5 and the corresponding discussion provide an overview of one mechanism or embodiment for achieving this solution. Additionally, or alternatively, FIG. 6 and the corresponding discussion provide an overview of another mechanism or embodiment for achieving the solution. Moreover, FIG. 7 provides a helpful overview of how the item of user equipment (e.g., a smartphone 706) shown in FIG. 7 may either be relatively stationary or, instead, relatively mobile, and this figure further provides an illustration of how this factor (i.e., stationary or mobile) may be relevant to the decision of which centralized unit-user plane node to assign to the item of user equipment, consistent with method 100 of FIG. 1.

The embodiment of FIGS. 4-5 focuses upon an improvement to the configuration of FIG. 3, as further discussed above. Accordingly, in this example, the message of method 100 may be formatted according to a version of the E1 Application Protocol (i.e., a version of this protocol which is been supplemented to enable the transmission of buffering-relevant information, as discussed further below).

In particular, the embodiment of FIGS. 4-5 improves upon the configuration of FIG. 3 at least in part by introducing information indicating, at least in part, a buffering capability 407 of the corresponding centralized unit-user plane node (i.e., centralized unit-user plane node 302 in this example). In this example, the message of method 100 includes a setup message (e.g., the message sent at step 303 of FIG. 4) for establishing a new connection between the specific centralized unit-user plane node and the centralized unit-control plane node. Thus, in workflow 400 of FIG. 4, at step 303 (see the discussion of workflow 300 above), centralized unit-user plane node 302 transmits a message, which may conform to a version of a GNB-CU-UP E1 setup request. In addition to the details of the setup request discussed above in connection with FIG. 3, the message of step 303 in the embodiment of FIG. 4 may further indicate buffering capability 407, which may correspond to the first buffering-relevant information of method 100.

Moreover, in the scenario of FIG. 4, the first buffering-relevant information (i.e., buffering capability 407) indicates a static capability of the specific centralized unit-user plane node to perform the buffering procedure. For example, buffering capability 407 may indicate a binary indication of yes or no regarding whether the corresponding centralized unit-user plane node is capable of performing the buffering procedure. Additionally, or alternatively, buffering capability 407 may indicate an available measurement of minutes or hours per packet in terms of its buffering capacity.

As used herein, the term "buffering-relevant" generally refers to information either that describes, in whole or in part, the capacity of centralized unit-user plane node to perform buffering (e.g., the first buffering-relevant information) and/or describes, in whole or in part whether the corresponding item of user equipment (see, for example, smartphone 706 in FIG. 7) has one or more characteristics, attributes, features, and/or items of functionality relevant to determining whether the centralized unit-user plane node should perform buffering with respect to the item of user equipment (e.g., the second buffering-relevant information). By way of illustrative example, it would not be appropriate to perform buffering if the centralized unit-user plane node lacks the ability to perform a corresponding buffering procedure and/or lacks sufficient bandwidth or other buffering-relevant resources to sufficiently perform the buffering procedure. The centralized unit-user plane node may lack such capabilities in a static sense (i.e., always lacks buffering capability, or lacks any such capability), or alternatively may simply lack such capabilities in a dynamic sense (e.g., although the centralized unit-user plane node has a general capacity for performing the buffering procedure, the node may be overburdened such that this capability is unavailable or otherwise diminished at a particular point in time, as further discussed below in the context of FIG. 5).

Similarly, it may not be appropriate to perform buffering if the item of user equipment is sufficiently active (e.g., according to a Radio Resource Control (RRC) active/inactive decision) and/or if the item of user equipment indicates high mobility (e.g., according to an Extended Discontinuous Reception/User Equipment (eDRX/UE) mobility prediction). Accordingly, each one of these different various factors may increase or decrease a score indicating appropriateness or applicability of the buffering procedure. The centralized unit-control plane node may assign a particular centralized unit-user plane node to a requesting item of user equipment having the highest score indicating that the assigned centralized unit-user plane node is the most appropriate or applicable, from among multiple candidates, to perform the buffering procedure. Alternatively, if it would not be appropriate or applicable to perform the buffering procedure (e.g., according to a threshold scoring measurement and comparison operation), the centralized unit-control plane node may assign the user equipment to a centralized unit-user plane node that lacks buffering capabilities, for example. In this case, assigning the user equipment to the buffering-incapable centralized unit-user plane node may thereby enable a different item of user equipment to be assigned to a different remaining centralized unit-user plane node that actually contains such functionality. The applicability of these factors to the assignment procedure of method 100 will be described in more detail below, for example in the context of the timing diagram of FIG. 7.

The following provides additional background information regarding the benefits of determining whether to perform the buffering procedure and determining which particular centralized unit-user plane node to assign to the item of user equipment. In some configurations, the radio area network (e.g., centralized unit-user plane node) does not buffer packet data. On the contrary, the user plane function (see FIG. 7), which can cover multiple radio array networks, can buffer packet data during a period in which the user equipment is unreachable. For scenarios involving an eDRX period of time (e.g., a few minutes to three hours, for example), the user plane function possessing a particular capability (e.g., extended buffering) can buffer the data packet from the user equipment. In these scenarios, user equipment type can be categorized as Reduced Capacity User Equipment (RedCAP).

Within the 3GPP framework (Rel-18), eDRX for a user equipment can be categorized into one of three separate states corresponding to connectivity indicated by the Radio Resource Control (RRC) protocol. These three separate states include RRC connected, RRC inactive, and RRC idle. Within the RRC connected state, data can proceed directly to the centralized unit-user plane node, whereas in the RRC idle state, the data can be buffered within the user plane function.

In contrast, in the RRC inactive state, if the eDRX categorization is applied, then the gNB or base station can notify the user plane function to delegate the packet data buffering. Nevertheless, if or when the user equipment has moved sufficiently far from an initial serving area, then there would predictably be packet forwarding between the previous centralized unit-user plane and the new centralized unit-user plane, and this scenario can delay data transmission. As used herein, the term "user equipment" can generally refer to endpoints accessing the overall telecommunications network, and which can be categorized into type such as IoT type, smartphone type, etc.

Returning to the figures, FIG. 5 parallels FIG. 4 substantially, except that in the configuration of FIG. 5, buffering capability 407 has been inserted into a centralized unit-user plane configuration update message sent at step 303 as shown in FIG. 5. In other words, in the example of FIG. 5, the message of method 100 (e.g., the message sent at step 303 of FIG. 5) includes a configuration update message for updating a configuration of a connection between the specific centralized unit-user plane node and the centralized unit-control plane node.

The configuration update message of FIG. 5 differs from the setup message of FIG. 4 in that this configuration update message may enable an updating to a previously established configuration for a connection between centralized unit-user plane node 302 and centralized unit-control plane node 301. In other words, whereas the scenario of FIG. 4 may originally establish new connections between centralized unit-user plane node 302 and centralized unit-control plane of 301, the scenario of FIG. 5 may update this previously established connection to modify or adjust it. Similarly, in response to the configuration update message sent at step 303 of FIG. 5, at step 304 the centralized unit-control plane node 301 may reply with a configuration update acknowledgment, as further shown in this figure. Moreover, in these examples, the first buffering-relevant information (e.g., buffering capability 407 in FIG. 5) indicates a dynamic capability of the specific centralized unit-user plane node to perform the buffering procedure. For example, buffering capability 407 in this figure may indicate various amounts of time (e.g., minutes or hours) available based upon current resource consumption available at the centralized unit-user plane node, for example.

Figure 6:
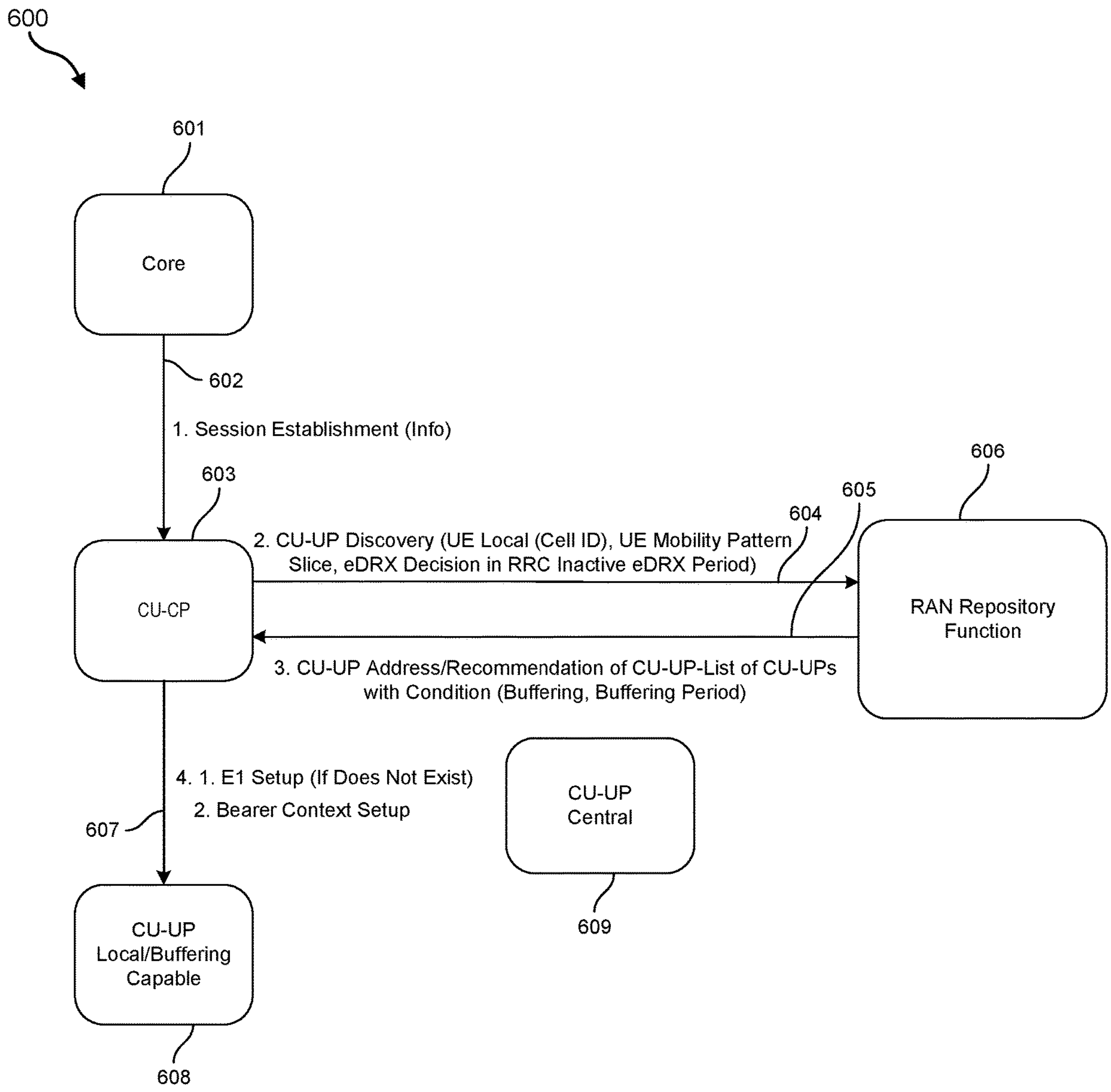
FIG. 6 shows an example workflow of communications between the centralized unit-control plane node and the centralized unit-user plane node according to one embodiment of the method shown in FIG. 1.
Figure 7:
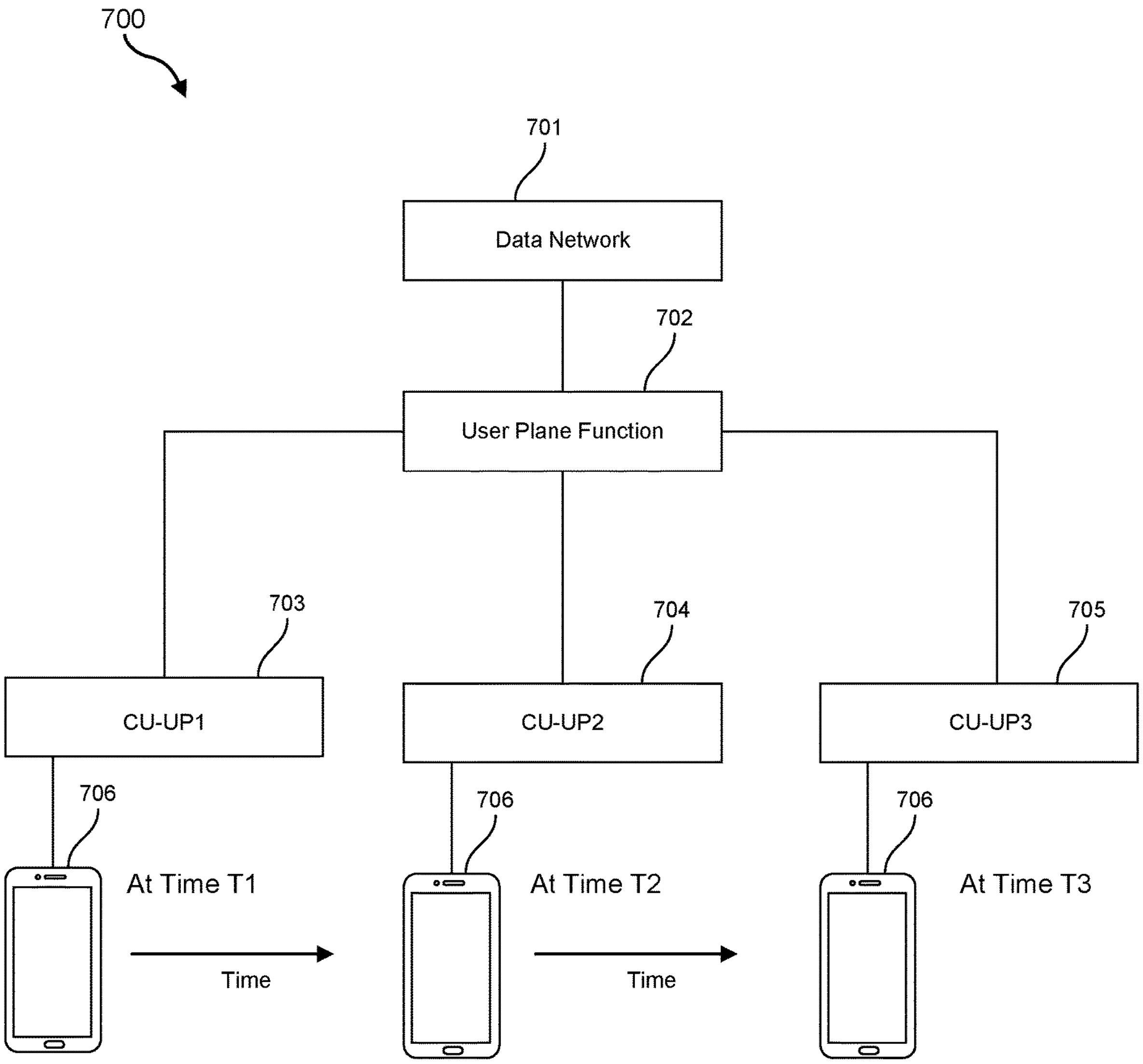
FIG. 7 shows a timing diagram that helps illustrate the utility of performing one or more embodiments of the method shown in FIG. 1 for selective centralized unit-user plane extended buffering.

In addition to the configuration of FIG. 5, or alternatively, FIG. 6 shows a more detailed and illustrative workflow 600 where the message of method 100 includes a radio access network repository function response message, as discussed further below. Workflow 600 generally outlines one or more features of the establishment of a session corresponding to the methodology of FIG. 1, as further discussed above. As further shown in this figure, workflow 600 may outline one or more interactions between various components, including a core 601, a centralized unit-control plane node 603, a radio access network repository function 606, a local centralized unit-user plane node 608, and/or a central centralized unit-user plane node 609. For example, an item of user equipment may attempt to establish a session with the network by first connecting with core 601. Subsequently, at step 604, core 602 may notify centralized unit-control plane node 603 about the specific attempt by the user equipment to establish the session. In response, centralized unit-control plane node 603 may initiate a procedure to assign a specific centralized unit-user plane node, such as local centralized unit-user plane node 608 to the user equipment consistent with method 100. In particular, centralized unit-control plane node 603 may perform method 100 to select between different available or candidate centralized unit-user plane nodes, such as the set of two centralized unit-user plane nodes shown in FIG. 6 (i.e., local centralized unit-user plane node 608 and central centralized unit-user plane node 609). In other words, in these examples the centralized unit-control plane node can select, from among multiple candidate centralized unit-user plane nodes, the specific centralized unit-user plane node for the user equipment by finding a match between the centralized unit-user plane discovery information and the identifying information for the multiple candidate centralized unit-user plane nodes.

Moreover, the selection process of method 100 can be based in part on buffering capabilities of the different candidate centralized unit-user plane nodes, and these capabilities can be recorded within radio access network repository function 606. For example, one or more of these centralized unit-user plane nodes may have previously registered or subscribed to radio access network repository function 606, and these nodes may have submitted an indication of one or more aspects of their buffering capabilities, or lack thereof, as part of the registration process, thereby informing radio access network repository function 606 of their capabilities. Subsequently, when an item of user equipment attempts to connect to the network, the centralized unit-control plane can reference these previously recorded indications of buffering capability to appropriately and selectively assign a centralized unit-user plane node to the item of user equipment, as discussed in more detail below.

At step 604, centralized unit-control plane node 603 may transmit a message as part of centralized unit-user plane discovery procedures. The message transmitted at step 604 may include one or more items of centralized unit-user plane discovery information, which can provide context or relevant data which centralized unit-control plane node 603 can evaluate in order to select a specific centralized unit-user plane node from among multiple candidate centralized unit-user plane nodes, as further discussed above. In these examples, the centralized unit-user plane discovery message can indicate at least one of a detected activity state of the item of user equipment or a predicted mobility pattern of the item of user equipment. In particular, as further shown in this figure, the centralized unit-user plane discovery information can include at least one of a user equipment location (e.g., a cellular identifier), a user equipment mobility pattern, a requested slice type, an eDRX decision in an RRC inactive eDRW period, etc. The centralized unit-user plane discovery information can also include a quality of service specification for the session, for example.

Subsequently, in response to step 604, radio access network repository function 606 can transmit a response message. The response message may include identifying information for at least one centralized unit-user plane node in accordance with method 100.

In some examples, the identifying information for at least one centralized unit-user plane node can further include a list of multiple centralized unit-user plane nodes. As further shown in FIG. 6, the identifying information for at least one centralized unit-user plane node can further specify a condition for each one within a set of multiple centralized unit-user plane nodes. For example, the condition can specify one or more aspects or attributes regarding an ability of the corresponding centralized unit-user plane node to perform buffering, such as a binary indication of whether buffering capability is available, and/or an indication of the corresponding buffering period, as further shown in this figure. Additionally, or alternatively, the condition further specifies, for each one within the set of multiple centralized unit-user plane nodes, at least one of latency from a distributed unit or radio unit, load information, or edge computing capacity information. In these examples, the message of method 100 (e.g., the message transmitted at step 605) is received in response to the centralized unit-control plane node transmitting (at step 604) a centralized unit-user plane discovery message requesting information regarding at least one candidate centralized unit-user plane node for assigning to the item of user equipment.

In the illustrative example of FIG. 6, the set of multiple centralized unit-user plane nodes can include local centralized unit-user plane node 608 and/or central centralized unit-user plane node 609. For purposes of simplicity and explanation, the illustrative example of workflow 600 shown in FIG. 6 may only include the two instances of centralized unit-user plane node outlined above, but in other examples a larger multitude of different centralized unit-user plane nodes, and different types of centralized unit-user plane nodes, may be referenced in connection with the performance of method 100.

Although the illustrative example of workflow 600 corresponds to a scenario where centralized unit-control plane node 603 performs method 100, in other examples radio access network repository function 606 may perform some, or all, of the selection procedure corresponding to method 100. In other words, some or all of the selecting functionality of method 100 may be offloaded from centralized unit-control plane node 603 onto one or more portions of radio access network repository function 606 in these examples.

At step 607 in workflow 600, a bearer context setup procedure may be performed. The bearer context may correspond to a block of information within the centralized unit-user plane node that is associated with the particular user equipment requesting the session with the network. The bearer context block of information can be used for the sake of communication over the E1 interface, for example. Additionally, in a scenario where an E1 configuration setup has not previously been established, then the E1 setup procedure associated with FIG. 3 may be performed.

FIG. 7 provides an illustrative timing diagram 700 to help explain the functioning of various embodiments for deciding between buffering data at the user plane function 702 or, instead, at a buffering capable centralized unit-user plane, including one or more of centralized unit-user plane node 703, centralized unit-user plane node 704, and centralized unit-user plane node 705, as further shown in this figure. Timing diagram 700 also further includes a data network 701, and an item of user equipment 706, which can be mobilized, as indicated by the timing diagram at the bottom of this figure from a time T1 to a time T2 to a time T3. In particular, from the perspective of a centralized unit-user plane node, if that particular centralized unit-user plane node lacks buffering capability, then it can be skipped as a candidate for matching to an item of user equipment where buffering would be appropriate, at least in a scenario where another centralized unit-user plane node is available that does possess such buffering capability. Similarly, from the perspective of the item of user equipment, buffering may be less appropriate if, and to the extent, the item of user equipment is mobilized and/or to the extent the item of user equipment is active. In those scenarios, buffering may be more preferentially performed at user plane function 702 rather than at one or more of centralized unit-user plane node 703, centralized unit-user plane node 704, and/or centralized unit-user plane node 705.

In contrast, buffering may be more appropriate at the centralized unit-user plane node, as distinct from user plane function 702, if, and to the extent that, the item of user equipment is stationary and/or to the extent that the item of user equipment is inactive. For example, many Internet of things devices, such as stationary devices, such as smart refrigerators or smart appliances, tend to not be mobile, and similarly tend to have longer sleep cycles, such that these Internet of things devices can become more appropriate candidates for the performance of a buffering procedure at the centralized unit-user plane node as distinct from the user plane function performing this buffering procedure.

Figure 8:
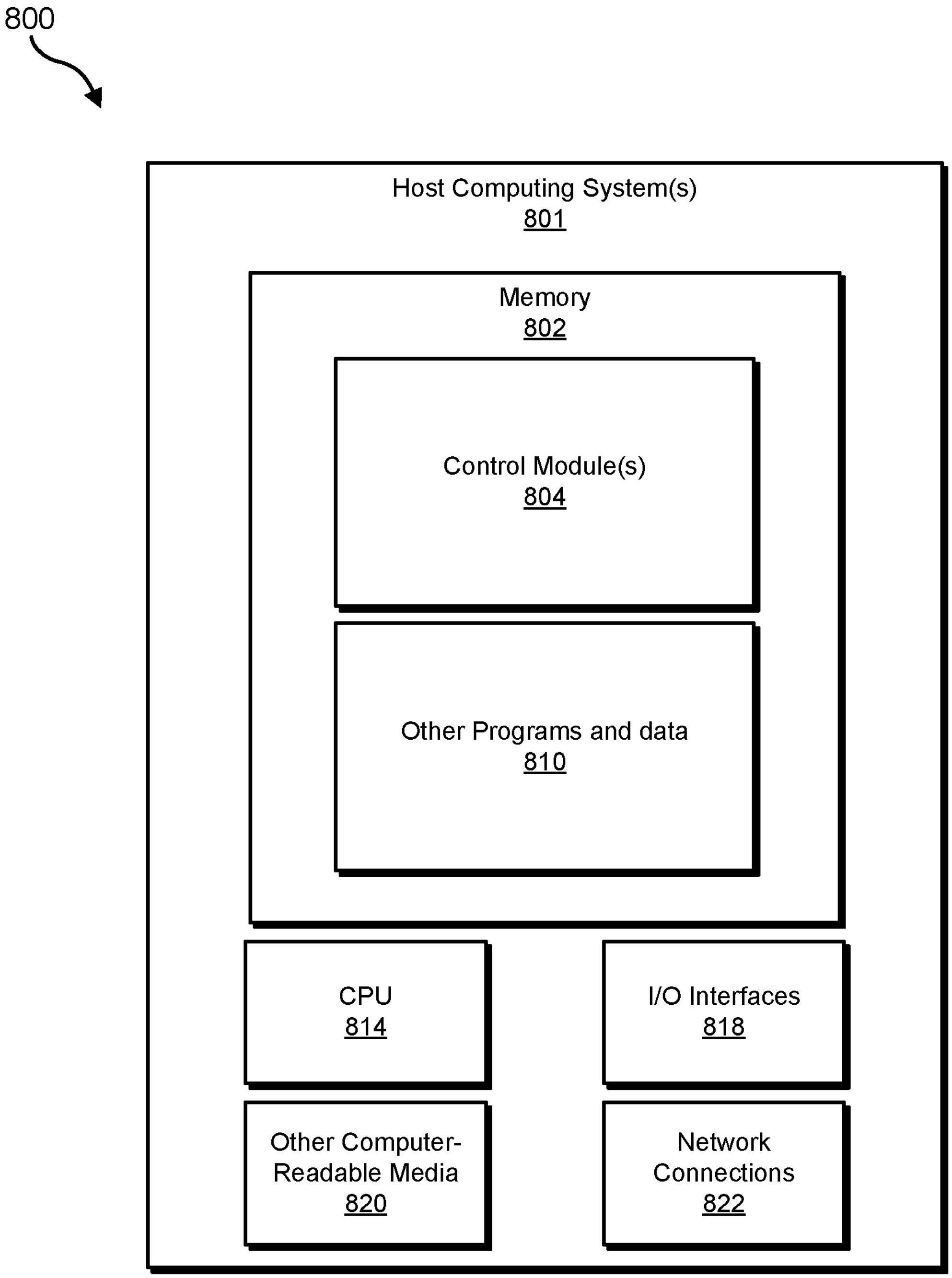
FIG. 8 shows an illustrative example computing environment which may facilitate the performance of one or more of the methods described herein.

FIG. 8 shows a system diagram that describes an example implementation of a computing system(s) for implementing embodiments described herein. The functionality described herein relating to selective centralized unit-user plane extended buffering can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 8 illustrates an example of underlying hardware on which such software and functionality may be hosted and/or implemented.

In particular, shown is example host computing system(s) 801. For example, such computer system(s) 801 may execute a scripting application, or other software application, to perform method 100, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof.

Host computer system(s) 801 may include memory 802, one or more central processing units (CPUs) 814, I/O interfaces 818, other computer-readable media 820, and network connections 822.

Memory 802 may include one or more various types of non-volatile and/or volatile storage technologies. Examples of memory 802 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 802 may be utilized to store information, including computer-readable instructions that are utilized by CPU 814 to perform actions, including those of embodiments described herein.

Memory 802 may have stored thereon control module(s) 804. The control module(s) 804 may be configured to implement and/or perform some or all of the functions of the systems or components described herein relating to selective centralized unit-user plane extended buffering. Memory 802 may also store other programs and data 810, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 822 are configured to communicate with other computing devices to facilitate the functionality described herein. In various embodiments, the network connections 822 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 818 may include a video interface, other data input or output interfaces, or the like. Other computer-readable media 820 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

receiving, by a centralized unit-control plane node within a telecommunications network, a message facilitating assignment of a specific centralized unit-user plane node to an item of user equipment, the message including first buffering-relevant information relating to an ability of the specific centralized unit-user plane node to perform a buffering procedure;

evaluating the first buffering-relevant information against second buffering-relevant information indicated by the item of user equipment attempting to connect to the telecommunications network through the specific centralized unit-user plane node, the second buffering-relevant information indicating at least in part whether the item of user equipment is an appropriate candidate for the buffering procedure; and assigning, by the centralized unit-control plane node, the specific centralized unit-user plane node to the item of user equipment based at least in part on evaluating the first buffering-relevant information relating to the ability of the specific centralized unit-user plane node to perform the buffering procedure against the second buffering-relevant information indicating at least in part whether the item of user equipment is an appropriate candidate for the buffering procedure.

2. The method of claim 1, wherein the message is formatted according to a version of the E1 Application Protocol.

3. The method of claim 2, wherein the message comprises a configuration update message for updating a configuration of a connection between the specific centralized unit-user plane node and the centralized unit-control plane node.

4. The method of claim 3, wherein the first buffering-relevant information indicates a dynamic capability of the specific centralized unit-user plane node to perform the buffering procedure.

5. The method of claim 1, wherein the message comprises a setup message for establishing a new connection between the specific centralized unit-user plane node and the centralized unit-control plane node.

6. The method of claim 5, wherein the first buffering-relevant information indicates a static capability of the specific centralized unit-user plane node to perform the buffering procedure.

7. The method of claim 1, wherein the message comprises a radio access network repository function response message received from a radio access network repository function.

8. The method of claim 7, wherein the message is received in response to the centralized unit-control plane node transmitting a centralized unit-user plane discovery message requesting information regarding at least one candidate centralized unit-user plane node for assigning to the item of user equipment.

9. The method of claim 8, wherein the centralized unit-user plane discovery message indicates at least one of a detected activity state of the item of user equipment or a predicted mobility pattern of the item of user equipment.

10. The method of claim 8, wherein the centralized unit-user plane discovery message indicates a location of the item of user equipment.

11. A non-transitory computer-readable medium encoding instructions that, when executed by at least one physical processor of a computing device, cause the computing device to perform a method comprising:

receiving, by a centralized unit-control plane node within a telecommunications network, a message facilitating assignment of a specific centralized unit-user plane node to an item of user equipment, the message including first buffering-relevant information relating to an ability of the specific centralized unit-user plane node to perform a buffering procedure;

evaluating the first buffering-relevant information against second buffering-relevant information indicated by the item of user equipment attempting to connect to the telecommunications network through the specific centralized unit-user plane node, the second buffering-relevant information indicating at least in part whether the item of user equipment is an appropriate candidate for the buffering procedure; and assigning, by the centralized unit-control plane node, the specific centralized unit-user plane node to the item of user equipment based at least in part on evaluating the first buffering-relevant information relating to the ability of the specific centralized unit-user plane node to perform the buffering procedure against the second buffering-relevant information indicating at least in part whether the item of user equipment is an appropriate candidate for the buffering procedure.

12. The non-transitory computer-readable medium of claim 11, wherein the message is formatted according to a version of the E1 Application Protocol.

13. The non-transitory computer-readable medium of claim 12, wherein the message comprises a configuration update message for updating a configuration of a connection between the specific centralized unit-user plane node and the centralized unit-control plane node.

14. The non-transitory computer-readable medium of claim 13, wherein the first buffering-relevant information indicates a dynamic capability of the specific centralized unit-user plane node to perform the buffering procedure.

15. The non-transitory computer-readable medium of claim 11, wherein the message comprises a setup message for establishing a new connection between the specific centralized unit-user plane node and the centralized unit-control plane node.

16. The non-transitory computer-readable medium of claim 15, wherein the first buffering-relevant information indicates a static capability of the specific centralized unit-user plane node to perform the buffering procedure.

17. The non-transitory computer-readable medium of claim 11, wherein the message comprises a radio access network repository function response message received from a radio access network repository function.

18. A system comprising:

a centralized unit-control plane node within a telecommunications network; and a specific centralized unit-user plane node within the telecommunications network;

wherein the centralized unit-control plane node is configured to perform a method comprising:

receiving a message facilitating assignment of a specific centralized unit-user plane node to an item of user equipment, the message including first buffering-relevant information relating to an ability of the specific centralized unit-user plane node to perform a buffering procedure;

evaluating the first buffering-relevant information against second buffering-relevant information indicated by the item of user equipment attempting to connect to the telecommunications network through the specific centralized unit-user plane node, the second buffering-relevant information indicating at least in part whether the item of user equipment is an appropriate candidate for the buffering procedure; and assigning the specific centralized unit-user plane node to the item of user equipment based at least in part on evaluating the first buffering-relevant information relating to the ability of the specific centralized unit-user plane node to perform the buffering procedure against second buffering-relevant information indicating at least in part whether the item of user equipment is an appropriate candidate for the buffering procedure.

19. The system of claim 18, wherein the message is formatted according to a version of the E1 Application Protocol.

20. The system of claim 18, wherein the message comprises a setup message for establishing a new connection between the specific centralized unit-user plane node and the centralized unit-control plane node.

* * * * *